United States Patent [19]

Deets et al.

[11] 4,141,931

[45] Feb. 27, 1979

[54] NITROGENOUS POLYMER COMPOSITION EMITTING REDUCED AMOUNTS OF HYDROGEN CYANIDE ON COMBUSTION

[75] Inventors: Gary L. Deets; Speros P. Nemphos, both of Springfield, Mass.

[73] Assignee: Monsanto Company, St. Louis, Mo.

[21] Appl. No.: 807,869

[22] Filed: Jun. 20, 1977

[51] Int. Cl.$^2$ ............................................... C08K 3/22
[52] U.S. Cl. .......................... 260/876 R; 260/45.7 S; 260/849; 260/857 R; 260/857 PA; 260/858; 260/887; 260/893; 260/898
[58] Field of Search ............... 260/45.7 S, 876 R, 898, 260/849, 857 R, 857 PA, 858, 887, 893

[56] References Cited

U.S. PATENT DOCUMENTS

| | | | |
|---|---|---|---|
| 3,639,518 | 1/1972 | Davies et al. | 260/45.7 R |
| 3,645,963 | 2/1972 | Kopacki et al. | 260/45.7 S |
| 3,869,420 | 3/1975 | Mathis et al. | 260/45.7 R |

*Primary Examiner*—James H. Derrington
*Attorney, Agent, or Firm*—David Bennett; William J. Farrington; James C. Logomasini

[57] ABSTRACT

Polymer compositions comprising a nitrogenous polymer, especially an acrylonitrile-containing polymer evolve reduced amounts of hydrogen cyanide on combustion when containing an alkaline earth metal oxide and a polysulfide rubber.

7 Claims, No Drawings

NITROGENOUS POLYMER COMPOSITION EMITTING REDUCED AMOUNTS OF HYDROGEN CYANIDE ON COMBUSTION

BACKGROUND OF THE INVENTION

This invention relates to a method for reducing the amount of noxious gas evolved during the combustion of a nitrogenous polymer.

It is known that when nitrogenous polymers are burned the combustion products are often found to comprise hydrogen cyanide. In view of the known toxicity of this gas it is desirable that the amount of any such gas released when these polymers burn be minimized.

It would also be advantageous if, when a polymer composition is made flame-retardant by the incorporation therein of a halogen-containing material, the emission of hydrogen chloride during decomposition of the polymer at high temperatures could be controlled.

It has now been discovered that the amount of noxious gas evolved during high temperature decomposition of nitrogenous polymers can be controlled by the use of a blend of certain additives.

SUMMARY OF THE INVENTION

The present invention provides a polymer composition comprising a nitrogenous polymer and from 2.5 to 20 percent by weight, based on the polymer, of an alkaline earth metal oxide and from 2.5 to 20 percent by weight, based on the polymer, of a polysulfide rubber.

The nitrogenous polymer is understood to be a polymer containing nitrogen such as for example polyamides, polyimides, melamine/formaldehyde, urea/formaldehyde, polyurethanes and acrylonitrile polymers (including copolymers). It is found that the additive combination is particularly suitable for use with the polymers containing nitrile monomers such as styrene/acrylonitrile polymers and acrylonitrile/butadiene/styrene including variations such as substitution of methacrylonitrile for acrylonitrile, chloroprene for butadiene and chlorostyrene for styrene.

The alkaline earth metal oxide component may be added in the form of effectively equivalent compounds which under polymer decomposition conditions yield oxide, such as calcium or magnesium carbonate or magnesium or calcium hydroxide. All such are intended to be embraced within the term "alkaline earth metal oxide". The preferred alkaline earth metal oxide is calcium oxide. The oxide component is also effective in reducing the hydrogen halide content of the emissions where the polymer composition contains a halogen containing component.

Polysulfide rubbers are long chain rubbery compounds containing a plurality of carbon-sulfur bonds. They conventionally have the formula $(RS_n)_x$ where n and x are integers and R is a difunctional aliphatic radical. In a typical method of producing polymers, an excess of sodium polysulfide is reacted with an aliphatic dihalide or di-2-chloroethyl formal or a mixture of both. Other suitable aliphatic dihalides include propylene dichloride, $\beta,\beta$-dichloroethyl ether and 1,3-glycerol dichlorohydrin. The properties of these polymers can be modified by crosslinking, chain scission, addition of different monomers, varying the proportions of the reactants and the like.

The amount of polysulfide rubber used can be from 2.5 to 20 percent by weight based on the polymer weight but is generally between 5 and 15 percent. About 8 to 12 percent by weight gives very good results. Likewise, the amount of alkaline earth metal oxide employed falls in the range 2.5 to 20 percent by weight based on the polymer weight with from 5 to 15 percent, and especially about 10 percent by weight, being preferred. Usually equal amounts of the oxide and the polysulfide rubber give satisfactory results.

The polymer composition may additionally comprise additives such as antioxidants, stabilizers of various sorts, fillers, and flame retardants. It is however, found that the use of a large amount of a halogen-containing flame retardant results in a reduced efficiency from the point of view of HCN emission reduction, possibly because one or both components are used up in reacting with the hydrogen halide. It is therefore advisable when the polymer compositions of the invention comprise a halogen-containing flame-retardant, that the quantities of additives be adjusted to give a balance of the desired properties.

DESCRIPTION OF THE PREFERRED EMBODIMENTS

The examples which follow demonstrate the effectiveness of the compositions of the invention. The important measurements of gas evolved on burning are made using an NBS smoke test chamber. This is a closed chamber adapted to permit two kinds of combustion, smoldering and flaming, indicated as SC and FC respectively. Gases evolved are sampled and analyzed. The actual measurement of the amount of HCN evolved is not considered to be a part of this invention. In this regard, any method capable of detecting amounts of HCN as low as one part per million can be used to measure the amount of evolved HCN. These methods, which are well known to those skilled in the art, include colorimetric measurements, polargraphic measurements, gas chromatographic measurements and electrochemical measurements. The results are expressed in parts per million by volume per 10 grams burned (ppmv/10 g).

The NBS Smoke Test Chamber is fully described in ASTM Special Technical Publication 422, page 174.

UNDERWRITER'S LABORATORY UL-94 TEST[1]

Fire retardant properties are measured using the "Test for Flammability for Plastic Materials - UL-94", Sept. 17, 1973. The test is carried out on test specimens 15.24cm × 1.27cm × 0.31cm.

[1] The numerical flame spread ratings reported herein are not intended to reflect hazards presented by the presently claimed compositions or any other materials under actual fire conditions.

The test specimen is supported from the upper end, with longest dimension vertical, by a clamp on a ring stand so that the lower end of the specimen is 0.93 cm above the top of the burner tube. The burner is then placed remote from sample, ignited and adjusted to produce a blue flame 1.86 cm in height.

The test flame is placed centrally under the lower end of the test specimen and allowed to remain for 10 seconds. The test flame is then withdrawn and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flame particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

EXAMPLES 1-4

These Examples demonstrate the effectiveness under both flaming and smouldering conditions of two compositions of the invention and demonstrate the synergistic effect obtained using the combination by comparison over either component alone.

In each case the base polymer is a copolymer of styrene and acrylonitrile polymerized in the presence of a polychloroprene rubber. The polymer composition comprises 33 percent by weight of acrylonitrile which is present either in the form of superstrate grafted onto the polychloroprene rubber or as matrix polymer.

The results obtained are set forth in Table I.

TABLE I

Summary of the results obtained in Examples 1 to 4 and four comparative examples:

| Ex. | Additive | Wt. % of Additives | Combustion Conditions | ppmv/10 g. HCN | % Reduction[1] in HCN |
|---|---|---|---|---|---|
| C1 | None | — | FC | 200 | — |
| C2 | None | — | SC | 200 | — |
| C3 | Thiokol FA[2] | 10 | FC | 200 | 0 |
| C4 | Calcium oxide | 10 | FC | 130 | 35 |
| 1 | Calcium oxide + | 10/10 | FC | 80 | 60 |
| 2 | Thiokol FA | | SC | 80 | 60 |
| 3 | Calcium oxide + | 10/10 | FC | 110 | 45 |
| 4 | Thiokol ST[2] | | SC | 70 | 65 |

[1]over the HCN evolved in the absence of any additive.
[2]Thiokol FA and Thiokol ST are polysulfide rubbers obtainable from Thiokol Corporation under those trade designations.
C1–C4 are comparative examples.

It can clearly be seen from the above that the present invention has an effectiveness that is beyond the mere sum of the effectivenesses of the individual components and that therefore a genuine synergistic effect is in operation.

EXAMPLES 5-9

These Examples demonstrate the effect on HCN evolution and flame retardance of varying the composition of the material under test.

The various components were compounded together and tested for HCN evolution under flaming conditions using the NBS Smoke Test Chamber techniques described above. The flame retardance was measured using the UL-94 test described above.

The results obtained are set forth in Table II.

TABLE II

Summary of the results from Examples 5 to 8 and one comparative example. All amounts of the components listed are percentages by weight.

| | EXAMPLES | | | | |
|---|---|---|---|---|---|
| | (C) | 5 | 6 | 7 | 8 |
| Grafted Polychloroprene Rubber[1] | 47 | 47 | 58.3 | 58.3 | 64.5 |
| SAN Grafted Polybutadiene[2] | 23 | 13 | — | — | — |
| Antimony oxide | 10 | 10 | 10 | 10 | 10 |
| FM 680[3] | 10 | 10 | 5.5 | 5.5 | 5.5 |
| Calcium oxide | 10 | 10 | 10 | 5 | 10 |
| Thiokol FA | — | 10 | 10 | 10 | 10 |
| SAN Copolymer[4] | — | — | 6.2 | 11.2 | — |
| ppmv/10 g. HCN Evolved | 250 | 200 | 150 | 190 | 140 |
| UL-94 Rating | Fail | V-1 | V-1 | V-0 | V-0 |

[1]A polychloroprene rubber grafted with styrene and acrylonitrile containing 42% rubber and having an S:AN ratio of 67:33.
[2]The grafted rubber contained 14% of the polybutadiene substrate and the S:AN ratio was 67:33.
[3]A halogenated aromatic flame retardant composition available from Michigan Chemical Co. under that trade name.
[4]S/AN ratio is 67:33.

From the results given in the above Tables it can be seen that it is possible by manipulating the relative proportions of flame retardant additive and calcium oxide, to obtain a product that shows reduced HCN emission while maintaining a high level of flame retardance.

The polymers of the present invention are useful for preparing a wide variety of molded objects such as radio and television cabinets, appliance housings, parts and components for vehicles, furniture and other related items.

Polymers of the present invention may be further modified with conventional additives and adjuvants such as fillers, plasticizers, U.V. stabilizers, heat stabilizers, anti-oxidants, etc. Care should be taken when formulating or compounding the polymers of the present invention so as not to affect adversely the toxic gas-suppressing properties of the compositions of the present invention.

It is anticipated that many minor modifications and variations could be made in the invention described herein without changing the essential elements thereof and it is understood that all such modifications and variations are embraced within the purview of this invention.

What is claimed is:

1. A polymer composition comprising a nitrogenous polymer and from 2.5 to 20 percent by weight, based on the polymer weight, of an alkaline earth metal oxide and from 2.5 to 20 percent by weight of a polysulfide rubber.

2. The polymer composition of claim 1 in which the nitrogenous polymer is a copolymer comprising from 10 to 90 percent of acrylonitrile.

3. The polymer composition of claim 2 in which the polymer is a polymer composition comprising a styrene/acrylonitrile copolymer and a diene rubber substrate with styrene and acrylonitrile grafted thereon.

4. The polymer composition of claim 1 which comprises from 5 to 15 percent by weight each of calcium oxide and a polysulfide rubber based on the polymer weight.

5. The polymer composition of claim 1 in which the amounts of alkaline earth metal oxide and polysulfide rubber are substantially equal.

6. The polymer composition of claim 1 that additionally comprises a halogenated aromatic flame-retardant additive.

7. A polymer composition comprising a copolymer of styrene and acrylonitrile and from 8 to 12 percent by weight based on the copolymer weight of each of calcium oxide and a polysulfide rubber.

* * * * *